Feb. 25, 1958    S. E. GORDON    2,824,471
MULTI-SPINDLE DRILLING MACHINE WITH INDIVIDUAL
SPINDLE HAVING UNIVERSAL
ADJUSTMENT IN A PLANE
Filed June 8, 1954
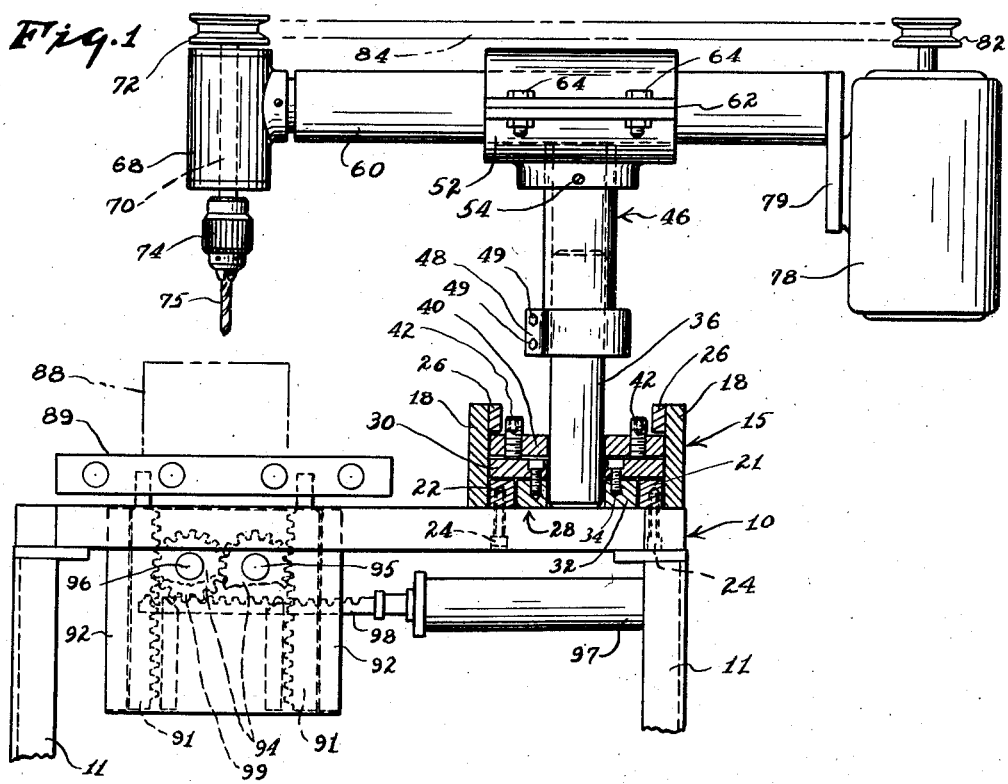
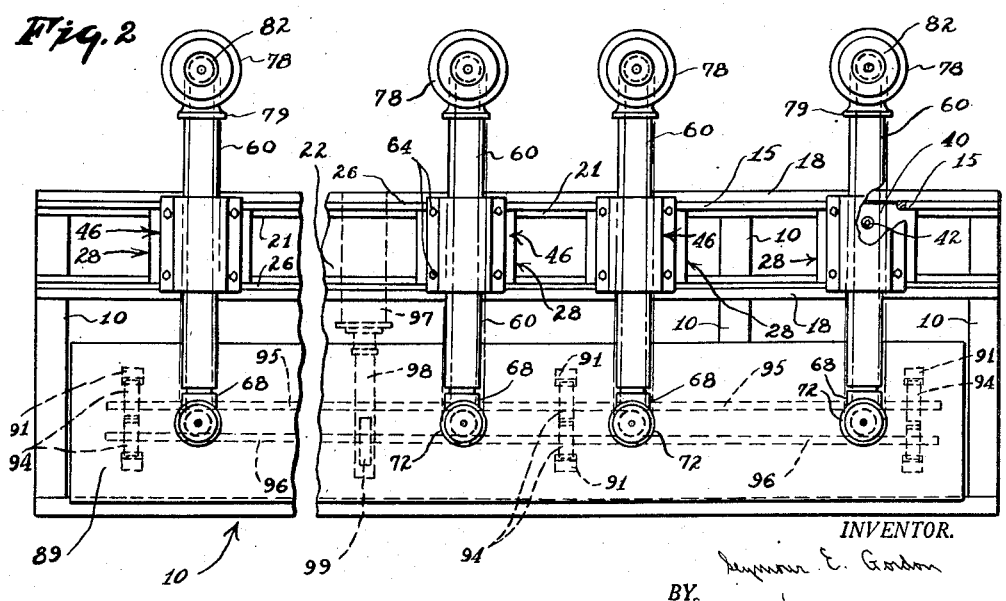
INVENTOR.
Seymour E. Gordon
BY Emery Varney,
Whittemore & Dix
ATTORNEYS United States Patent Office 2,824,471
Patented Feb. 25, 1958

2,824,471

MULTI-SPINDLE DRILLING MACHINE WITH INDIVIDUAL SPINDLE HAVING UNIVERSAL ADJUSTMENT IN A PLANE

Seymour E. Gordon, Rockville Centre, N. Y., assignor to Gang Driller Machine Works Inc., Brooklyn, N. Y., a corporation of New York Application June 8, 1954, Serial No. 435,303

7 Claims. (Cl. 77—24)

This invention relates to machine tools and more especially to drilling machines. The preferred embodiment of the invention is a gang drill, but some features of the invention are suitable for use with other tools and tool holders.

It is an object of the invention to provide improved apparatus for holding a tool, or a plurality of tools, more especially drills, in pre-selected positions for operating on a work piece. Another object is to provide a gang drill in which the different drills can be adjusted into any desired position in respect to one another for simultaneously drilling holes at different selected positions on a single work piece which is supported from a table.

The preferred construction uses a table which is raised and lowered to bring the work piece into contact with the drills and to move the work piece with respect to the drills as the drilling operations progress. This construction, whereby the work piece is moved with respect to the drills, instead of having the drills moved toward the work piece as in the conventional drill press, makes it possible to simplify the construction of the carriages by which the drills are adjustable into different positions.

One feature of the invention relates to a frame having a guideway along which a plurality of separately adjustable carriages can be moved and locked in various selected positions for holding a tool assembly at those positions above a table on which the work piece is carried.

Other objects, features and advantages of the invention will appear or be pointed out as the description proceeds.

In the drawing, forming a part hereof, in which like reference characters indicate corresponding parts in all the views;

Figure 1 is an end view of a tool assembly and a sectional view through the guideway and work support with which the tool assembly is used;

Figure 2 is a reduced, top plan view of the apparatus shown in Figure 1.

The illustrated machine includes a main frame 10 which has legs 11 that rest on a floor or other underlying support. There is a guideway 15 extending lengthwise along the main frame 10.

The guideway 15 comprises a channel with side walls 18 and with a bottom made up of rails 21 and 22. These rails extend for the full length of the guideway, and the guideway is closed at the bottom between the rails 21 and 22 at those regions where the main frame 10 extends under the side plates 18. However the main frame 10 is made up of a plurality of transversely extending frame elements and the channel of the guideway is open between the rails 21 and 22 at the regions between these transverse frame elements.

There are inwardly extending rims 26 secured to the inside faces of the side plates 18 near the upper ends of these side plates. The rims 26 make the sides of the guideway "channelled" as in undercut or recessed guideways, and the carriage can be locked at selected locations along the guideway in a manner which will be more fully explained.

Within the guideway there is a carriage 28 made up of a middle plate 30 which extends between the side plates 18 and which rests on the rails 21 and 22. This middle plate 30 is slightly narrower than the width of the space between the side plate 18 so as to leave at least a free running clearance for the plate 30 to slide lengthwise along the rails 21 and 22. The carriage 28 also includes a bottom plate 32 secured to the underside of the middle plate 30 by screws 34 countersunk in the middle plate 30. This bottom plate 32 is located in the space between the rails 21 and 22 and is an integral part of the carriage. A post 36 is attached to the plates 30 and 32 and also comprises an integral part of the carriage 28.

The post 36 extends for a substantial distance above the carriage 28 and above the upper limits of the guideway 15 for supporting a tool assembly. The post 36 can be shifted to any desired position lengthwise of the guideway 15 by sliding the carriage 28 along the rails 21 and 22. In order to lock the carriage 28 in any selected position along the guideway 15, there is a clamping plate 40 of approximately the same width of the middle plate 30 and thick enough to substantially fill the space between the top of the middle plate 30 and the bottom faces of the inwardly extending rims 26. The post 36 extends through an opening in the clamping plate 40 to hold the clamping plate against longitudinal or transverse movement with respect to the middle plate 30. The sides of the clamping plate extend along the sides 18 of the guideway 28 for a substantial distance and they are immediately adjacent to the side 18. This prevents rotation of the clamping plate about the post 36.

There are screws 42 threaded through the clamping plate 40, and when these screws 42 are screwed down against the middle plate 30, they cause the clamping plate 40 to rise and press against the bottom faces of the rims 28. This clamps the bottom plate 30 against the top face of the clamping face 40 against the bottom faces of the rims 26 with sufficient pressure to hold the carriage 28 against movement along the guideway.

A support 46 fits over the upper end of the post 36, and in the construction shown is a telescoping fit on the post. The post 36 is cylindrical and the support 46 is rotatable about the axis of the cylinder. The support 46 is split at its lower end and there is a split clamp 48 which clamps the split lower end of the support 46 firmly against the sides of the post 36 to prevent rotation of the support 46 on the post. The clamp 48 is tightened or loosened by manipulating scrows 49. Such split clamps are well known, and no further illustration or description of this clamp 48 is necessary for a complete understanding of this invention.

The lower portion of the support 46, which fits over the post 36, is a sleeve; and the upper portion of the support 46 is a bearing 52 with a recess in its bottom wall into which the sleeve portion of the support extends. The sleeve portion and bearing portion of the support 46 are secured together by a screw 54 and they may be more permanently locked together by welding or by threading or brazing or any other suitable method. The screw 54 is merely representative of a rigid connection between the lower and upper portions of the support 46.

A tubular frame 60, preferably of circular cross section, extends through the opening of similar cross section in the bearing 52. This opening, which provides the bearing surfaces of the bearing 52, has its axis substantially horizontal. The bearing 52 is preferably split along a line 62 and there are bolts 64 extending across the split in the bearing for clamping the bearing against the tubular frame 60. When the bolts 64 are tight, the bearing 52 clamps the tubular frame 60 against longitudinal movement, but when the bolts 64 are loosened, the tubular frame can be adjusted lengthwise with respect to the support 64 for obtaining the desired location of a drill or other tool carried at the left end of the tubular frame 60.

A headstock 68 is secured to the left hand end of the tubular frame 60. A drive shaft 70 extends through the headstock 68 and has a pulley 72 at its upper end. A chuck 74 at the lower end of the shaft 70 is used for holding a drill 75. Different sizes of drills can be placed in the chuck 74 in accordance with conventional practice. The shaft 70 turns in suitable bearings in the headstock 68; and the pulley 72 and chuck 74 are rigidly connected to the shaft 70 so that rotation of the pulley 72 is transmitted through the shaft to the chuck 74.

At the other end of the tubular frame 60, there is an electric motor 78 secured to a bracket 79 which is fastened to the tubular frame. A pulley 82 at the upper end of the armature shaft of the motor 78 has a belt 84 extending to the pulley 72 for transmitting power from the motor 78 to the pulley 72 and drill chuck 74. For any particular machine, the speed ratio between the motor 78 and the drill chuck 74 is determined by the relative sizes of the pulleys 82 and 72 on the motor shaft and the chuck drive shaft. A work piece 88, shown in phantom in Figure 1, is supported by a work table 89 extending for substantially the full length of the main frame 10. This work table 89 is supported at a plurality of different locations along its length by supporting elements comprising racks 91 which are vertically movable in guides 92 carried by the main frame 10. In order to insure equal movement of the different racks 91, they all mesh with pinion gears 94 fastened to shafts 95 which run lengthwise and these shafts are made to turn simultaneously and through equal but opposite angles of rotation by having at least one of the pinions 95 mesh with one of the pinions 96, or by otherwise connecting the shafts with connecting motion transmitting means.

The shaft 95 is rotated by power supplied from a cylinder 97 located under a portion of the main frame 10 and having a piston rod connected to a rack 98 which meshes with a driving pinion 99 on the shaft 95. The cylinder 97 is double acting so that the admission of working fluid under pressure to one end of the cylinder rotates the shaft 95 in a direction to raise the work table 89 toward the drill 75; and the admission of working fluid to the other end of the cylinder operates the mechanism to lower the work table 89 away from the drill.

Figure 2 is a top plan view of the machine and shows four separate tool assemblies each of which comprises a headstock 68, tubular frame 60, motor 78 and support 46. Each of these tool assemblies is carried on a separate carriage 28 movable independently along the guideway 15 and capable of being clamped in any adjusted position along the guideway as already explained in connection with Figure 1.

The construction of the machine provides for universal adjustment of the drills over the work table 89. Adjustment along the x-axis is accomplished by moving the carriages 28 along the guideway 15. The y-axis coordinate of adjustment is obtained by moving the tubular frame 60 longitudinally in the bearing 52. Some additional flexibility of adjustment is obtained by rotating the support 46 on the post of the carriage. If any holes to be drilled are so close together that one headstock 68 prevents the drill of another headstock from being placed in position to drill the second hole, drill heads having more than one chuck can be used on the tool assembly. Such multiple drill heads are well known and no illustration or further description of them is necessary for a complete understanding of this invention.

The preferred embodiment of the invention has been illustrated and described, but changes and modifications can be made and some features can be used in different combinations without departing from the invention as defined in the claims.

What is claimed is:

1. A gang drilling machine including a main frame having a guideway extending lengthwise thereof, a plurality of carriages that are adjustable into different positions along the guideway independently of one another, means for clamping the carriages at any selected positions along the guideway, a work table, a tool assembly carried by each of the carriages and having one end extending outwardly over the work table, each tool assembly including a supporting frame and a drill located at the end of the frame over the work table, a support on each carriage connecting the tool assembly frame with the carriage and rotatable with respect to the carriage about a substantially vertical axis to provide angular movement of the tool assembly over the work table and, in combination with the adjustment of the carriages along the guideway, provide the drill with universal adjustment in a plane over the work table, and bearing means on which the drill is movable toward and from the substantially vertical axis to change the radius about which the drill is angularly movable.

2. The gang drilling machine described in claim 1, and in which there are means for changing the position of each drill assembly in a substantially vertical direction, and locking means for holding each drill in any position to which it is adjusted in a vertical direction.

3. The gang drilling machine described in claim 2, and in which there is a work table assembly that moves up and down toward and from the drill assemblies and into positions that are parallel to one another.

4. The gang drilling machine described in claim 1, and in which the supporting frame with the drill at one end has a motor at the other end and has motion transmitting connections between the motor and the drill.

5. The gang drilling machine described in claim 1, and in which the supporting frame of each tool assembly has a bearing surface that slides longitudinally in the support on the carriage to which the tool assembly frame is connected.

6. The gang drilling machine described in claim 1, and in which the guideway has confronting channels on opposite sides thereof and each carriage has a sliding frame which moves along the guideway as a track and which extends into the channels of the guideway, and there is a clamping plate on top of the sliding frame substantially filling the space between the top of the sliding frame and the faces of the channels above the frame, and adjustable means for pushing the clamping plate upwardly against the confronting faces of the channels with resulting reaction of the sliding frame against its underlying supporting surface to clamp the sliding frame and plate against movement lengthwise of the guideway.

7. The gang drilling machine described in claim 1, and in which each carriage has a post extending upwardly therefrom and the support on each carriage is located on the post and has both vertical and swinging movements on the post for providing adjustment of the drill with respect to the work table and with respect to the locations of the other drills.

References Cited in the file of this patent

UNITED STATES PATENTS

| 419,071 | Richards | Jan. 7, 1890 |
| 746,521 | Kagelmacher | Dec. 8, 1903 |
| 1,245,360 | Lutz | Nov. 6, 1917 |
| 2,346,198 | Tautz | Apr. 11, 1944 |